INVENTOR.
MORRIS R. WEINGARTEN

Jan. 16, 1968

M. R. WEINGARTEN 3,364,054

METHOD OF SALVAGING PHOSPHOR SLURRY IN A SPIN
COATING PROCESS FOR MAKING PHOSPHOR
SCREENS FOR CATHODE RAY TUBES

Filed Oct. 14, 1963

INVENTORS
MORRIS R. WEINGARTEN
BY
William A. Balesak
Attorney

INVENTOR.
MORRIS R. WEINGARTEN
BY
William A. Zalesak
Attorney

Jan. 16, 1968   M. R. WEINGARTEN   3,364,054
METHOD OF SALVAGING PHOSPHOR SLURRY IN A SPIN
COATING PROCESS FOR MAKING PHOSPHOR
SCREENS FOR CATHODE RAY TUBES

Filed Oct. 14, 1963   4 Sheets-Sheet 4

INVENTOR.
MORRIS R. WEINGARTEN
BY
William A. Zalesak
Attorney

United States Patent Office 3,364,054
Patented Jan. 16, 1968

3,364,054
METHOD OF SALVAGING PHOSPHOR SLURRY IN A SPIN COATING PROCESS FOR MAKING PHOSPHOR SCREENS FOR CATHODE RAY TUBES
Morris R. Weingarten, Lancaster, Pa., assignor to Radio Corporation of America, a corporation of Delaware
Filed Oct. 14, 1963, Ser. No. 315,819
3 Claims. (Cl. 117—33.5)

This invention relates to the making of phosphor screens for cathode ray tubes. The invention is particularly directed to the salvage removal of a quantity of phosphor slurry from a faceplate panel onto which an excess of slurry has previously been dispensed for the purpose of depositing a phosphor layer thereon.

In one method of making phosphor screens, a slurry is prepared which includes phosphor powder, a photosensitive gel, and a liquid such as water. A quantity of the slurry is dispersed into and spread over the faceplate portion of a shallow bowl-like faceplate panel. This quantity is normally in excess of that needed to adequately coat the faceplate. The excess is then removed from the panel by a salvage operation for subsequent reuse. The slurry coating on the faceplate is dried and exposed to a pattern of ultra-violet light. The areas of the dried slurry layer which are exposed to the ultra-violet light become hardened and adherent to the faceplate. The slurry layer is then developed, for example, such as by water spray, to remove the unexposed areas thereof. In making a plural color, mosaic phosphor screen, the above steps are repeated for each of the different color phosphors.

Except for the salvage operation to which this invention is directed, the slurry screening method described above and apparatus for its practice may be that disclosed in U.S. Patent 2,902,973 issued to Weingarten et al. on Sept. 8, 1959. The salvage method of the present invention and the apparatus herein disclosed for its practice may be incorporated with the teachings and apparatus of the Weingarten et al. patent.

In salvaging slurry from round faceplate panels, the panel can be rotated to centrifugally move the excess slurry outwardly to the peripheral side wall of the panel. A scoop can then be inserted into the spinning panel at its periphery to scoop the excess slurry therefrom. However, in the case of rectangular faceplate panels, this practice of directly scooping the excess slurry from the panel is not used because of the non-circular periphery of the panel.

It is therefore an object of this invention to provide a method for salvaging the excess slurry from a rectangular faceplate panel.

In accordance with this invention, a faceplate panel is rotated about its central axis to centrifugally flow the excess slurry contained therein toward and up the side wall of the panel. Continued rotation of the panel then centrifugally slings the excess slurry away from the panel and through space and into slurry collector means disposed adjacent to but spaced from the panel. The slurry is then removed from the slurry collector means for example by draining or scooping it therefrom for subsequent reuse in screening another faceplate.

Figure 1:
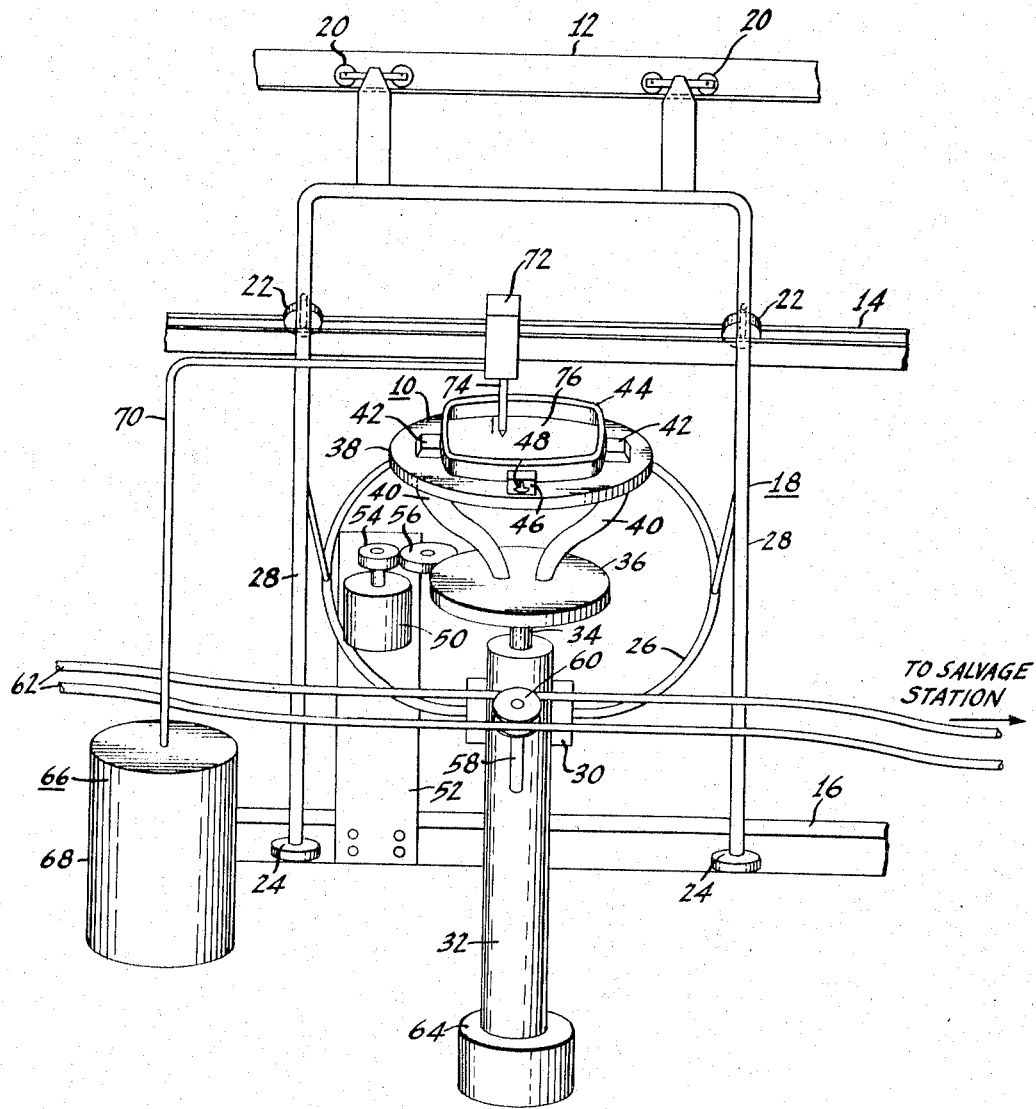
FIG. 1 is a perspective view of apparatus similar to that described in the Weingarten et al. patent, supra, and which may be used in depositing phosphor layers by the slurry method.

FIG. 1 illustrates a portion of a screen coating conveyor apparatus similar to that described in the Weingarten et al. patent, supra. The apparatus comprises a rotatable faceplate panel carrier 10 which is movable along a plurality of fixed rails 12, 14, and 16. A frame 18 is movably supported on the rails 12, 14, 16 by rollers 20, 22, and 24, respectively. The frame 18 includes a substantially circular, horizontally disposed, support bracket 26 attached to a pair of upright stations 28. The loop-like support bracket 26 is interrupted to provide two ends on which a pair of pivot blocks 30 are mounted. The rotatable carrier 10 is pivotally mounted for tilting about a horizontal axis between the pivot blocks 30.

The carrier 10 includes a housing 32 pivotally mounted between the pivot blocks 30. A spindle 34 is rotatably mounted within the housing 32 and has attached thereto a circular drive wheel 36. A base plate 38 is supported on a plurality of arms 40 which are attached to the drive wheel 36. Three fixed faceplate panel holding brackets 42 (only two of which are shown) are attached to the base plate 38 in positions so that the two short sides and one of the long sides of a faceplate panel 44 may be received thereagainst. A fourth holding bracket 46 is attached to the base plate 38 and a provided with an adjustable clamping means 48 which is adapted to bear against the other long side of the faceplate panel 44, and thereby secure the panel to the carrier 10. Other clamping means as are well known in the art may be used.

An electric drive motor 50 is mounted on a bracket 52 secured to the lower conveyor rail 16. The motor 50 is provided with a drive wheel 54 which drives an idler wheel 56 also mounted on the bracket 52. The idler wheel 56 in turn rotatably drives the circular drive wheel 36 to rotate the faceplate panel 44 about its central axis.

The carrier 10 also includes an arm 58 extending from the housing 32. A roller 60 is rotatably attached to the end of the arm 58 and is received between a pair of parallel rails 62. The rails 62 extend along the conveyor and are twisted and include raised and lowered sections so as to rotate the carrier 10 on the pivot blocks 30 to provide the desired tilting of the faceplate panel 44 as the carrier indexes from station to station along the conveyor apparatus. A counter weight 64 is attached to the end of the carrier housing 32 opposite the base plate 38.

In FIG. 1, the carrier 10 is illustrated at the phosphor slurry dispensing station. At this station, a slurry agitating, circulating, and dispensing apparatus 66 is provided. The slurry apparatus 66 includes a tank 68 from which slurry is circulated through suitable piping 70 to a slurry dispensing head 72. A slurry dispensing nozzle 74 depends from the head 72 and is vertically movable to the vicinity of the faceplate panel 44 so that a measured quantity of phosphor slurry can be dispensed from the nozzle 74 into the panel 44.

When a desired quantity of phosphor slurry is dispensed into the panel 44 and the motor 50 is energized, the panel 44 is rotated to cause the slurry to be swirled over the faceplate 76 of the panel. When the faceplate 76 has been completely covered, the carrier 10 is indexed along the conveyor apparatus to an adjacent slurry salvage station.

Figure 3:
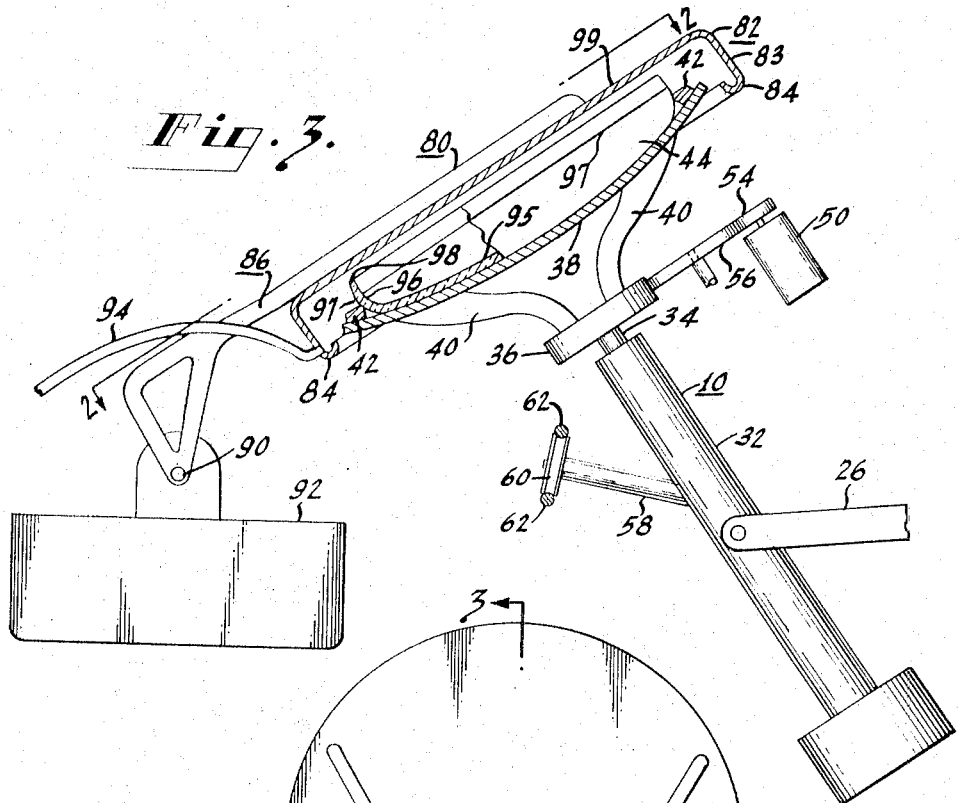
FIGS. 2 and 3 are plan and partial section views, respectively, of one embodiment of apparatus suitable for practicing the invention.
Figure 2:
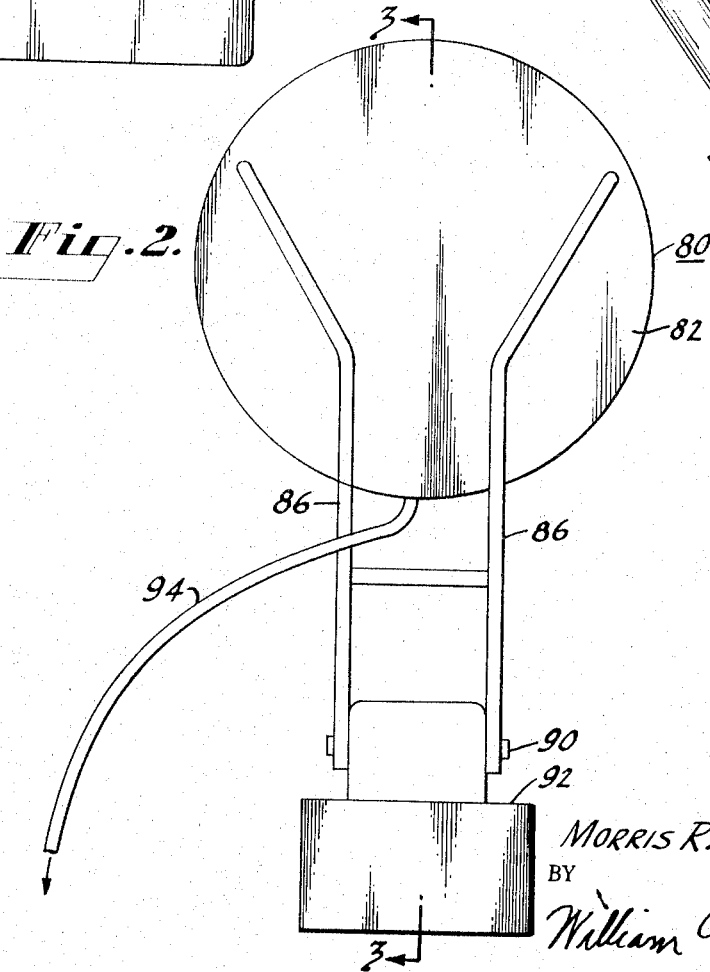

FIGS. 2 and 3 illustrate slurry salvage apparatus 80 which may be positioned at the slurry salvage station. The apparatus 80 includes a large shallow salvage pan 82 which is adapted to be positioned upside-down over the open face of a spinning faceplate panel 44. The salvage pan 82 includes a cylindrical side wall 83 which terminates at its open end with an up-turned lip 84 so as to contain the salvaged slurry which is thrown into the pan. The pan 82 is attached to a bracket 86 which is pivotally mounted by a shaft 90 in a housing 92. Actuation means (not shown) is located in the housing 92 for pivotally moving the bracket 86 about the axis of the shaft 90.

A flexible hose 94 is connected to the bottom of the salvage pan 82 and extends downwardly therefrom to permit gravity flow of salvaged slurry to be returned to the phosphor dispensing apparatus 66 at the phosphor dispensing station.

During the slurry salvage operation a carrier 10 is indexed along the conveyor apparatus to the slurry salvage station where its drive wheel 36 makes contact with an electric motor and drive system 50, 54, and 56 similar to that located at the slurry dispensing station. The salvage pan 82, which, prior to the carrier being indexed to the slurry salvage station, is disposed in a position raised with respect to that shown in FIG. 3, is now pivotally lowered to the FIG. 3 position. The speed of the drive motor 50 is then increased so as to produce a centrifugal flow of the excess slurry contained in the faceplate panel 44 outwardly from the center thereof to adjacent the side walls of the panel. Continued rotation of the panel results in the slurry flowing to the four corners thereof and up the slightly inclined side wall at the four corners. The slurry is then centrifugally slung from the panel 44, through space, and against the cylindrical wall 83 of the salvage pan 82.

As shown in FIG. 3, the faceplate panel 44 includes a faceplate portion 95 and a side wall portion 96. Such a panel is normally formed in a two-piece mold which produces on the outer surface of the side wall 96 a ridge 97 which encircles the panel and constitutes an outer-most extremity thereof. The ridge 97 is referred to in the industry as the mold-match line of the panel.

When slurry is centrifugally removed from the panel 44 as described above, it actually flows across the faceplate 95, toward the side wall 96, up the side wall at the four corners thereof, and over the edge 98 of the side wall. Much of the slurry continues its flow down the outer surface of the side wall to the ridge 97. Since the ridge is the outermost extremity of the panel, the slurry is then centrifugally thrown off of the panel at this point. Some of the slurry is thrown off of the panel from points between the edge 98 and the ridge 97 during its flow therebetween.

When substantially all of the excess slurry has been centrifugally thrown from the panel 44, the bracket 86 is pivoted so as to raise the salvage pan 82 away from the carrier 10. The carrier is then indexed along the conveyor apparatus to the next station thereof.

When the bracket 86 is pivoted upwardly to raise the salvage pan 82, the slurry which has been collected in the upturned lip 84 and not yet drained therefrom flows to the bottom of the pan 82 and out the flexible hose 94.

In the phosphor screening of 25-inch (diagonal dimension) rectangular faceplate panels using the apparatus 80, one suitable operation involves dispensing 130–140 cc. of phosphor slurry into the panel. The carrier is indexed into salvage position with the axis of rotation of the panel 44 tilted about 30° from the vertical. The panel 44 is then rotated for about one second at about 45 r.p.m., then for about three seconds at about 75 r.p.m., and then finally for about 20 seconds at about 125–135 r.p.m. Such a rotating of the faceplate panel 44 results in about 100–105 cc. of phosphor slurry being centrifugally slung into the salvage pan 82 from the panel and returned to the slurry dispensing station.

In the slurry salvage apparatus 80, only the peripheral portions of the salvage pan 82 serve to collect and drain phosphor slurry which is centrifugally thrown from the panel 44. The central flat portion 99 of the pan 82 serves only as a convenient means for mounting the pan to the bracket 86. Accordingly, insofar as the collection and drainage of slurry is concerned, the center portion 99 of the pan 82 may be omitted and an annular member comprising the side wall 83 and the upturned lip 84 portions of the pan 82 used. In this respect, the slurry salvage pan 82 may be thought of as a shallow right-side-up pan having an opening in its bottom through which a spinning faceplate panel 44 is disposed during a phosphor slurry salvage operation.

Figure 4:
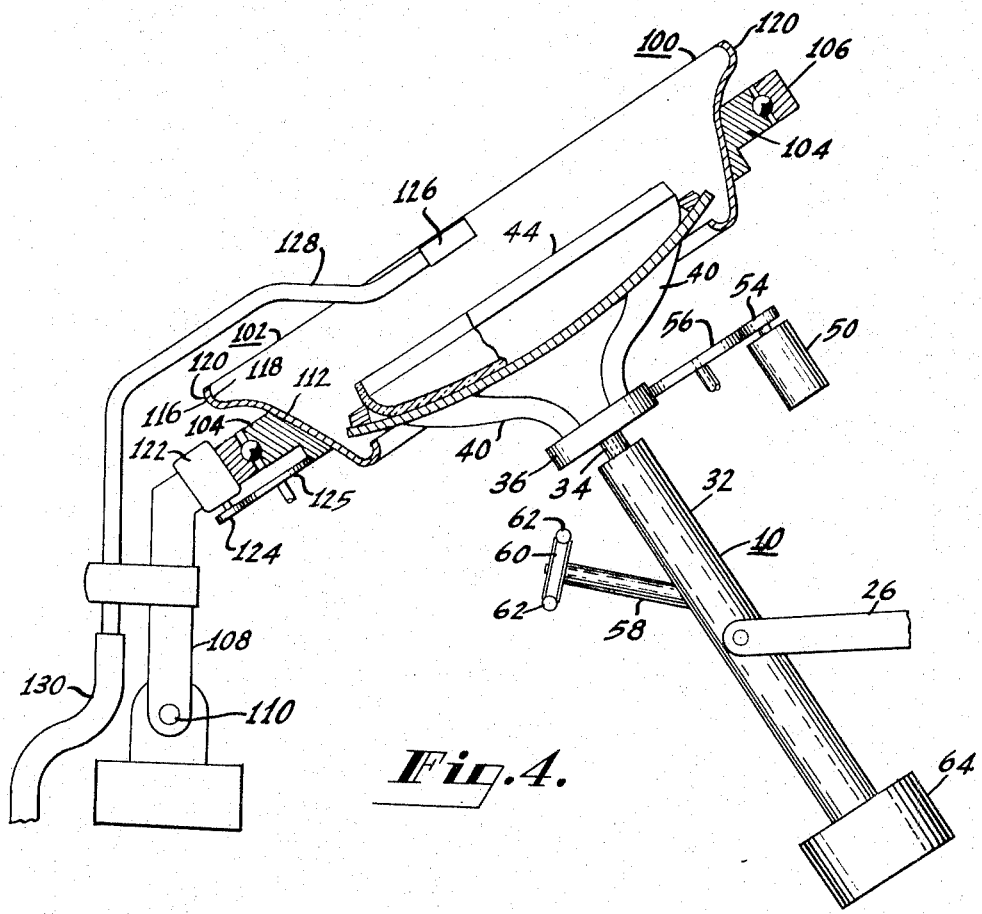
FIG. 4 is a partial section view of a second embodiment of apparatus suitable for practicing the invention.

FIG. 4 illustrates an alternative embodiment of phosphor slurry salvage apparatus 100 which may be located at the slurry salvage station. The apparatus 100 comprises an annular pan 102, secured to a mounting rim 104 which is rotatably mounted in a surrounding support ring 106. The support ring 106 is attached to a bracket 108 which is pivotally mounted on a shaft 110 to permit raising and lowering of the apparatus 100 into slurry salvage relationship with a carrier 10. Like the apparatus 80 of FIGS. 2 and 3 the apparatus 100 is positioned at the slurry salvage station and is lowered into slurry salvage relationship with a spinning faceplate panel 44 which is supported on a carrier 10 which is indexed along the conveyor apparatus to the slurry salvage station.

In operation of the apparatus 100, the annular pan 102 is lowered over a spinning faceplate panel 44 so that the lip of the panel protrudes upwardly into the pan 102. When the faceplate panel 44 is rotated at a sufficient speed, the excess slurry therein is centrifugally thrown from the panel through space and against a sloping side wall 112 of the pan 102. The pan 102 is provided with an up-turned lip 114 at its bottom and with an upper rim portion 116 which preferably includes a short substantially planar ledge 118 and a terminating upturned lip 120.

During a slurry salvage operation the annular pan 102, which is independent from the carrier 10, is rotated about its center axis by a drive motor 122 on which a drive wheel 124 is mounted. The drive wheel 124 contacts an idler wheel 125 which in turn contacts the annular mounting rim 104 of the pan 102. Rotation of the annular pan 102 causes the slurry which has been centrifugally thrown from the panel 44 into pan 102 to be centrifugally moved out the slooping wall 112 and into the ledge 118 against the lip 120. A stationary nozzle 126 is located at the upper extremity of the annular pan 102 and is held against the lip 120 by a pipe 128 which is mounted on the bracket 108. Slurry which is centrifugally moved to the region of the lip 120 is scooped therefrom by the nozzle 126 and drains by gravity down the pipe 128 to a flexible hose 130 which returns the slurry to the phosphor dispensing apparatus 66.

Figure 5:
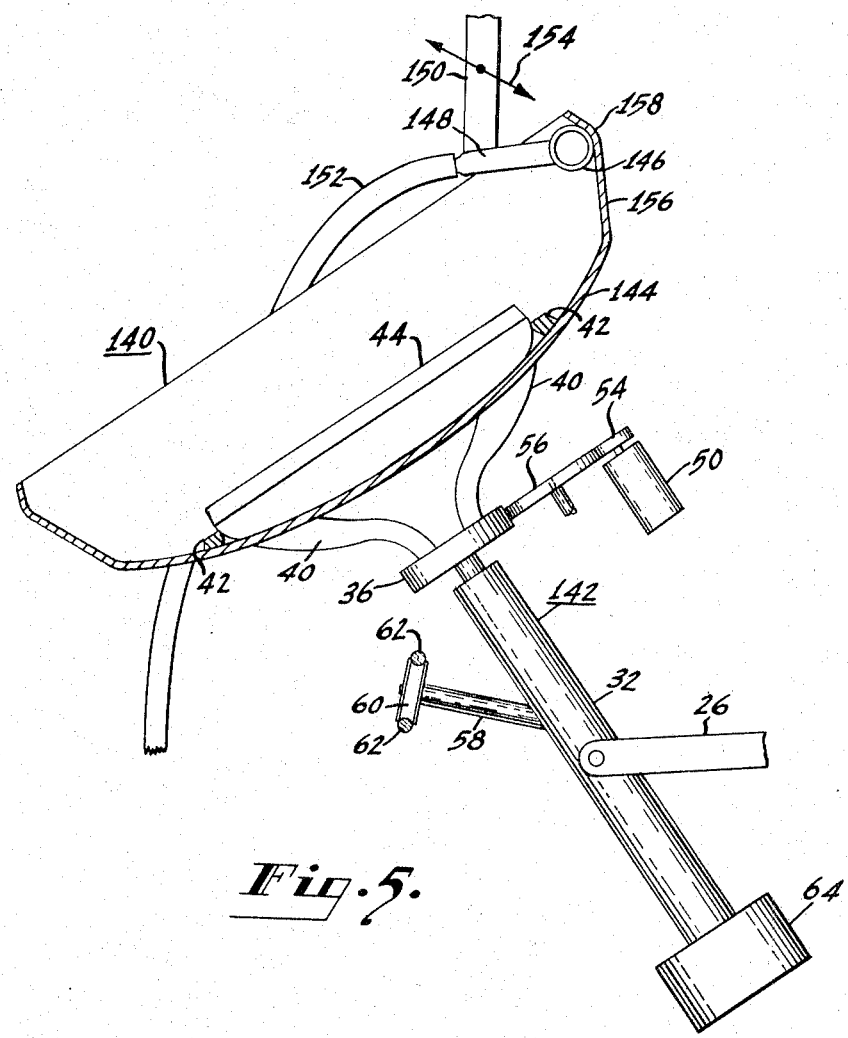
FIG. 5 is a partial section view of a third embodiment of apparatus suitable for practicing the invention.

FIG. 5 illustrates another embodiment of slurry salvage appartus 140. The apparatus 140 differs from the apparatus 80 and 100 in that a part of the apparatus is mounted on a faceplate panel carrier 142. This part of the apparatus 140 is therefore duplicated for each of the carriers of the conveyor apparatus. The carrier 142 differs from the carrier 10 in that the base plate 38 of the carrier 10 is replaced by a large diameter slurry salvage pan 144. A faceplate panel 44 is secured within the salvage pan 144 by brackets 42 and 46 similar to those provided on the base plate 38 on the carrier 10. Other parts of the carrier 142 are substantially identical to those of the carrier 10.

The slurry salvage apparatus 140 also includes a slurry scoop nozzle 146 connected to a pipe 148 which is supported by a movable bracket 150. A flexible hose 152 is connected to the pipe 148 and extends downwardly so as to drain by gravity phosphor slurry which is scooped by the nozzle 146. The hose 152 returns the scooped slurry to the phosphor dispensing apparatus 66 at the phosphor dispensing station.

The bracket 150 together with the pipe 148, nozzle 146, and hose 152 is located at the phosphor slurry salvage station. The nozzle 146 is movable into and out of slurry salvaging relationship with the salvage pan 144 as schematically indicated by the arrows 154. When moved into slurry salvage position, the nozzle-pipe-hose device 146, 148, 152 function in the manner similar to the nozzlepipe-hose device 126, 128, 130 of the slurry salvage apparatus 100 of FIG. 4.

In operation a faceplate panel 44 is secured within the salvage pan 144. Phosphor slurry is then dispensed into the panel 44 and swirled over the faceplate surface thereof. The carrier 142 carrying the panel 44 and pan 144, is then indexed to the slurry salvage station where it engages a drive motor 50 which causes the cap 44 and pan 144 to be rotated. At the same time, the bracket 150 carrying the salvage nozzle 146 is moved downwardly into the salvage pan 144. Rotation of the panel 44 causes the slurry therein to be centrifugally flowed to the four corners and up the side walls thereof. The slurry is then centrifugally thrown from the panel 44, through space, and against a sloping side wall 156 of the pan 144. From there the slurry is centrifugally flowed up the side wall 156 to the nozzle 146, which rides against an up turned lip 158 of the pan. Slurry is thus scooped from the pan 144 by the nozzle 146 and returned via the hose 152 to the slurry dispensing apparatus 66 of FIG. 1.

What is claimed is:

1. The method of salvaging phosphor slurry from a rectangular cathode ray tube faceplate panel having a side wall and into which an excess of slurry has been previously dispensed for the purpose of depositing a phosphor layer thereon, said method comprising the steps of:
    (a) rotating said panel about its central axis to centrifugally flow the excess slurry therein toward and up said side wall and onto an outer surface thereof,
    (b) rotating said panel about said axis to centrifugally sling said excess slurry off of said outer surface and through space away from said panel,
    (c) collecting the excess slurry so centrifugally thrown from said panel in an annular slurry collector pan spaced from and surrounding said panel,
    (d) tilting said pan to drain said excess slurry therefrom, and
    (e) collecting said excess slurry from said tilted collector pan.

2. The method of salvaging phosphor slurry from a rectangular cathode ray tube faceplate panel having a peripheral side wall and into which an excess of slurry has been previously dispensed for the purpose of depositing a phosphor layer thereon, said method comprising the steps of:
    (a) moving a slurry collector means into a salvage position surrounding and closely-spaced from said panel,
    (b) centrifugally flowing the excess slurry therein toward the four corners of said panel and up said side wall,
    (c) centrifugally throwing said excess slurry through space out of and away from said panel into said slurry collector means disposed adjacent to said panel,
    (d) moving said slurry collector means to effect a removal therefrom of slurry centrifugally thrown thereinto from said panel, and
    (e) removing said slurry collector means from said salvage position.

3. In a method for making a phosphor screen for a cathode ray tube, the steps of:
    (a) affixing the faceplate panel of said tube to a carrier means of a screening conveyor apparatus, said carrier means being adapted to spin and tilt said panel and to move said panel along a path past a plurality of stations,
    (b) moving said panel along said path to a phosphor slurry dispensing station of said conveyor apparatus,
    (c) dispensing onto said panel an amount of slurry including a portion in excess of that required to produce a screen on said panel,
    (d) moving said panel along said path to a phosphor slurry salvage station,
    (e) moving an annular slurry collector pan into said path in a salvage position surrounding and closely spaced from said panel,
    (f) spinning said panel to move said excess slurry toward the edges of said panel and to sling said excess slurry from said panel through space and into said surrounding collector pan,
    (g) moving said collector pan out of said path and away from said panel,
    (h) advancing said panel along said path, and
    (i) collecting said excess slurry from said collector pan.

References Cited

UNITED STATES PATENTS

| | | | |
|---|---|---|---|
| 2,119,309 | 5/1938 | Batchelor | 117—101 |
| 2,902,973 | 9/1959 | Weingarten et al. | 118—53 |
| 3,143,435 | 8/1964 | Martyny | 117—101 |

ALFRED L. LEAVITT, *Primary Examiner.*

RALPH S. KENDALL, *Examiner.*

A. H. ROSENSTEIN, H. COHEN, *Assistant Examiners.*